US012043959B2

(12) United States Patent
Nussbaumer

(10) Patent No.: US 12,043,959 B2
(45) Date of Patent: Jul. 23, 2024

(54) METHOD FOR CONTROLLING A DEVICE FOR TREATING HIGH-CONSISTENCY PULP

(71) Applicant: VOITH PATENT GMBH, Heidenheim (DE)

(72) Inventor: Markus Nussbaumer, Ravensburg (DE)

(73) Assignee: Voith Patent GmbH, Heidenheim (DE)

( * ) Notice: Subject to any disclaimer, the term of this patent is extended or adjusted under 35 U.S.C. 154(b) by 508 days.

(21) Appl. No.: 17/422,829

(22) PCT Filed: Jan. 9, 2020

(86) PCT No.: PCT/EP2020/050358

§ 371 (c)(1),
(2) Date: Jul. 14, 2021

(87) PCT Pub. No.: WO2020/151951

PCT Pub. Date: Jul. 30, 2020

(65) Prior Publication Data

US 2022/0098790 A1 Mar. 31, 2022

(30) Foreign Application Priority Data

Jan. 25, 2019 (DE) .................... 10 2019 101 808.0

(51) Int. Cl.
*D21D 1/00* (2006.01)
*B02C 7/14* (2006.01)
(Continued)

(52) U.S. Cl.
CPC ............... *D21D 1/002* (2013.01); *B02C 7/14* (2013.01); *B02C 7/186* (2013.01); *D21D 1/006* (2013.01);
(Continued)

(58) Field of Classification Search
CPC ................................ B02C 7/14; B02C 7/186
See application file for complete search history.

(56) References Cited

U.S. PATENT DOCUMENTS 5,500,088 A * 3/1996 Allison .................... D21D 1/30
241/30
2007/0090828 A1 4/2007 Akerblom
(Continued)

FOREIGN PATENT DOCUMENTS

DE 19914669 A1 5/2000
EP 0006315 A1 1/1980
(Continued)

*Primary Examiner* — Bobby Yeonjin Kim
*Assistant Examiner* — Jared O Brown
(74) *Attorney, Agent, or Firm* — Laurence A. Greenberg; Werner H. Stemer; Ralph E. Locher

(57) ABSTRACT

A device for processing high-consistency fibrous material has a housing. First and second treatment tools in the housing are fastened to a base plate, have a rotationally symmetrical form, are arranged coaxially to each other, rotate relative to one another about a common axis and delimit a treatment gap through which the fibrous material radially flows. The gap width of the gap is varied by axially shifting at least one base plate of a treatment tool. In order to determine the minimum distance between the base plates, the oscillations are detected on the device and the distance between the base plates rotating relative to one another is reduced until the frequency and/or the amplitude and/or the change in frequency and/or the change in amplitude of the oscillations exceeds a limit value. The distance when the limit value is exceeded is determined as the minimum distance.

30 Claims, 1 Drawing Sheet

(51) Int. Cl.
*B02C 7/18* (2006.01)
*B02C 25/00* (2006.01)
*D21D 1/30* (2006.01)

(52) U.S. Cl.
CPC ............... *D21D 1/008* (2013.01); *D21D 1/30* (2013.01); *D21D 1/303* (2013.01); *B02C 25/00* (2013.01)

(56) References Cited

U.S. PATENT DOCUMENTS

| | | | | |
|---|---|---|---|---|
| 2007/0125891 | A1* | 6/2007 | Crossley .................. | D21D 1/30<br>241/30 |
| 2009/0032630 | A1* | 2/2009 | Svedberg ................. | D21D 1/30<br>241/28 |
| 2019/0184590 | A1* | 6/2019 | Takahashi ................ | B26D 5/00 |

FOREIGN PATENT DOCUMENTS

| | | | | | |
|---|---|---|---|---|---|
| EP | 1147806 | A1 | | 10/2001 | |
| EP | 1793033 | A1 | | 6/2007 | |
| JP | 2003112069 | A | * | 4/2003 | |
| JP | 2003112069 | A | | 4/2003 | |
| WO | 0171276 | A1 | | 9/2001 | |
| WO | WO-2017191030 | A1 | * | 11/2017 | ............... D21D 1/20 |

* cited by examiner

METHOD FOR CONTROLLING A DEVICE FOR TREATING HIGH-CONSISTENCY PULP

BACKGROUND OF THE INVENTION

Field of the Invention

The invention relates to a method for controlling a device for treating high-consistency fibrous material, comprising a housing in which a first treatment tool and a second treatment tool are arranged, wherein the treatment tools are each fixed to a base plate, have a rotationally symmetrical form, are arranged coaxially with respect to each other, rotate relative to one another about a common axis and delimit a treatment gap through which the fibrous material flows radially and of which the gap width can be varied via an axial displacement of at least one base plate of a treatment tool.

As a result of the high consistency which the fibrous material has during the treatment, intensive mechanical processing is possible in such devices (dispergers, refiners), although the treatment tools that can be moved relative to one another do not touch but, instead, move past one another at a very short distance. In the process, very considerable forces occur.

Devices of the aforementioned type are used, for example, to improve the quality of pulp, thermo-mechanical pulp (TMP), or fibrous material which has been obtained from recycled paper.

It is known that paper fibrous material can be homogenized by disperging and substantially improved as a result. In many cases, use is made of a fibrous material which has a dryness between 15 and 35% and has been brought to a temperature which lies far above ambient temperature. It is expedient to perform the heating when the fibrous material already has its consistency required for the disperging.

Likewise, it has also been known for a long time to refine pulp fibers, i.e. fresh pulp and/or recycled paper fibers, in order to be able to achieve the desired properties, in particular with regard to strength, porosity, formation and surface, in the fibrous web produced therefrom.

In the refiners which are used, because of the relatively rapid wear, the refining surfaces are formed by replaceable refiner fillings screwed to the corresponding base plate.

For the achievement of the desired fiber properties, in particular the freeness, the refiner fillings must be matched as well as possible to the fibrous material to be treated, also to prevent excessive wear of the fillings.

In addition, to increase the efficiency of the fiber treatment, the aim is optimum utilization of the available refining surface.

In every case, if the gap is too large, the efficiency of the treatment decreases. If the gap is too small, there is in turn the danger of an excessively high electrical power consumption and of the contact of the treatment tools.

Therefore, sensors for measuring the current gap width have been developed, although these are very expensive.

SUMMARY OF THE INVENTION

The object of the invention is to permit safe and efficient operation of these devices using the simplest possible means.

According to the invention, the object has been achieved in that, to determine the minimum distance between the base plates, the oscillations on the device are detected, in particular on at least one element of the same, and the distance between the base plates rotating relative to one another is reduced until the frequency and/or the amplitude and/or the change in the frequency and/or the change in the amplitude of the oscillations exceeds a limiting value, and the distance when the limiting value is exceeded is defined as the minimum distance.

Usually, in the case of new treatment tools or new refiner fillings, the zero point, at which the treatment tools come into contact with one another, is established when the device is at a standstill. Starting from this zero point, a minimum distance between the opposite base plates of the treatment tools is then defined with a certain safety margin.

With increasing wear of the treatment surface of the treatment tools directed toward the gap, however, the gap between the treatment tools increases. This is associated with a reduction in the drive power introduced and a reduced efficiency of the treatment of the fibrous material.

As a result, a renewed determination of the zero point at a standstill becomes necessary, which is associated with a corresponding outlay and assumes a certain know-how.

As opposed to this, the inventive solution permits safe and simple determination of the minimum distance between the base plates during rotation of the treatment tools relative to one another.

The rotational speed during the determination of the minimum distance between the base plates can often lie in the region of the operating rotational speed.

However, in order to avoid damage, it may consequently be advantageous if the rotational speed during the determination of the minimum distance between the base plates lies below the operating rotational speed, preferably below 1000 revolutions per minute.

As the distance becomes smaller, the opposite treatment tools approach one another, which has an influence on the oscillatory behavior of the treatment device.

No later than when the treatment tools come into contact without any pressing force, the oscillations change so highly that this can be used to determine the minimum distance.

It has proven to be particularly safe if the distance between the base plates rotating relative to one another is reduced until the change in the frequency of the oscillations exceeds a limiting value, and the distance when the limiting value is exceeded is defined as the minimum distance.

The distance between the base plates can generally be reduced continuously or in steps, preferably in decreasing steps. Although this can be done manually, it should preferably be done under control.

In order to prevent damage to the treatment tools, the distance between the base plates during operation should, however, be set by a predefined value, which advantageously lies between 0.1 and 0.4 mm, above the minimum distance as a safety margin.

The determination of the minimum distance between the base plates should always be carried out during the start-up of the device and/or following a change of a treatment tool.

Since the distance between the treatment tools increases during operation as a result of wear, the determination of the minimum distance between the base plates should, however, also be carried out during operation, preferably at specific time intervals, in particular periodically.

In order to configure the determination of the minimum distance between the base plates to be as safe as possible, fibrous material should flow through the treatment gap during the determination of the minimum distance, wherein one or more parameters of the fibrous material, preferably all the important ones, should advantageously lie in a predefined operating range during the determination of the minimum distance between the base plates.

Here, the important parameters of the fibrous material appear to be in particular the quantity of fibrous material flowing through the treatment gap, the electrical power consumption of the treatment device, the temperature and the consistency of the fibrous material.

Alternatively, for simplification, the determination of the minimum distance, in particular during start-up or after a change of a treatment tool, can also be carried out when no fibrous material is flowing through the treatment gap.

Irrespective of the specific embodiment, the invention also permits a method for determining the treatment gap width during the operation of a device for treating high-consistency fibrous material. To this end, following the determination of the minimum distance, the change in the axial distance between the base plates is measured, starting from the minimum distance, and used as a reference base for the current treatment gap width.

The indication of the treatment gap width is significant in particular in dispergers, and was hitherto only insufficiently satisfactory because of the low gap widths.

The change in the axial distance between the base plates can be measured via displacement transducers, in particular inductive displacement transducers.

In the interests of a simple construction of the device, one treatment tool should rotate and the other not, wherein only one treatment tool is axially displaceably supported. In specific embodiments, the treatment tool and base plate can also be designed in one piece.

The use of the method according to the invention in a disperger, a deflaker or a refiner is particularly advantageous.

The fibrous material can in particular also be thermomechanical pulp (TMP), high-yield pulp, medium-density fiberboard (MDF) fibrous material, wood chips or similar materials.

The invention is to be explained in more detail below by using two exemplary embodiments.

DETAILED DESCRIPTION OF THE INVENTION

Figure 1:
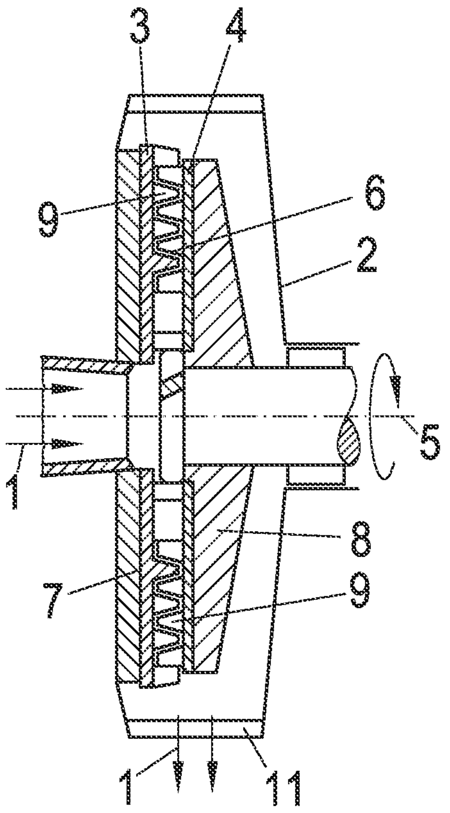
FIG. 1 shows a schematic cross section through a disperger.

According to FIG. 1, the high-consistency paper fibrous material 1 is forced directly into the central region of the disperger filling, which is formed by the two treatment tools 3, 4.

While one treatment tool 3 is stationary, i.e. does not rotate and is therefore formed as a stator, the other treatment tool 4 is rotatably mounted in the housing 2 of the disperger.

The disperger filling having the stator and the rotor is charged radially inwardly. As is known, dispersing is effected by teeth 9 being moved relatively closely past one another at a relatively high speed and the fibrous material 1 located between them being subjected to high shear forces. To this end, the fibrous material 1 can be heated previously via hot steam. Following the dispersing, the disperged fibrous material 1 falls out downward through the outlet 11.

If the axial position of the stator base plate 7 and rotor base plate 8 relative to each other is changed, then the gap 6 between the treatment tools 3, 4 also changes as a result, by which means the performance of the disperger can be controlled in a manner known per se.

The treatment tools 3, 4 each have a rotationally symmetrical form. The treatment tools 3, 4 arranged coaxially relative to one another each have teeth 9 arranged in multiple annular rows concentric relative to their center, between which there are tooth gaps, through which the fibrous material 1 flows radially toward the outside.

Between the rows of teeth there are annular interspaces, which are arranged in such a way that at least one row of teeth of a treatment tool 3, 4 reaches into an annular interspace of the other, complementary treatment tool 4, 3.

Figure 2:
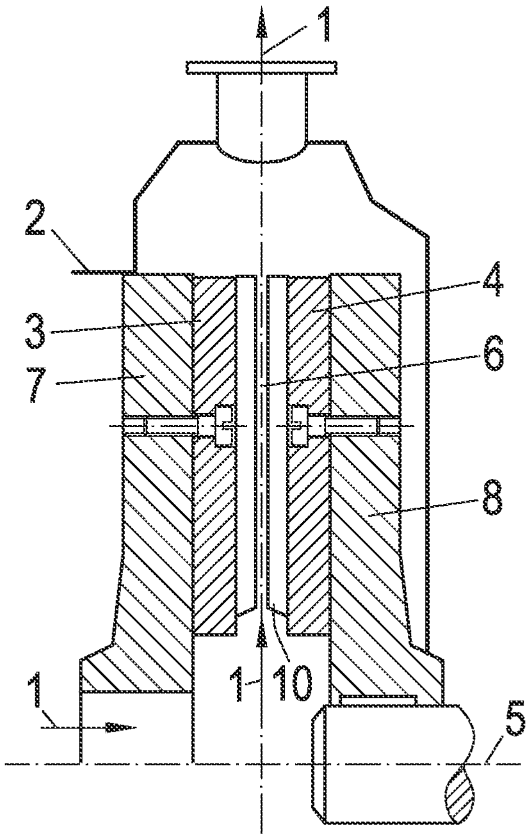
FIG. 2 shows a schematic cross section through a refiner.

As distinct from this, FIG. 2 shows a refining arrangement having a refining gap 6, which is formed by a treatment tool 3 that is stationary, i.e. non-rotating and coupled to the housing 2, and a treatment tool 4 rotating about an axis of rotation 5.

The two annular refining surfaces run parallel to each other, wherein the gap distance between these is adjustable via an axial displacement, normally of the non-rotating treatment tool 3.

The rotating refining surface here is moved in the rotational direction by a shaft rotatably mounted in the housing 2. This shaft is driven by a drive, likewise present in the housing 2.

The fibrous suspension 1 to be refined in the example shown gets into the refining gap 6 between the refining surfaces of the two treatment tools 3, 4 via a feed through the center.

The fibrous suspension 1 passes radially outwardly through the interacting refining surfaces and leaves the adjoining annular space through an outlet.

The two refining surfaces are each formed by multiple refiner plates, which each extend over a circumferential segment of the corresponding refining surface.

Lined up in a row beside one another in the circumferential direction, the refiner plates result in a continuous refining surface.

The refiner plates and therefore also the refining surfaces are as a rule formed by a multiplicity of refiner bars 10 extending substantially radially and grooves located in between.

Not illustrated are the means known per se with which the non-rotating treatment tool 3 is displaced axially and the extent of this axial displacement is measured. The rotating treatment tool 4 does not change its axial position.

Common to both embodiments is that the treatment tools 3, 4 are fixed to corresponding base plates 7, 8. As distinct from the examples shown here, the treatment gap 6 can not only extend vertically but also at an angle to the axis of rotation 5, such as, for example, in conical refiners.

During start-up of the treatment device and/or following a change of a treatment tool 3, 4 and/or during the operation of the treatment device, the determination of the minimum distance $s_M$ between the base plates 7, 8 is carried out during rotation of the corresponding treatment tool 4.

During the determination of the minimum distance, the rotational speed lies in the range of the operating rotational speed or advantageously below the operating rotational speed, preferably below 1000 revolutions per minute.

Via the determination of the minimum distance $s_M$, damage to or excessive wear of the treatment tools 3, 4 during operation can be prevented.

Furthermore, via the determination of the minimum distance $s_M$ during operation, a treatment gap 6 between the treatment tools 3, 4 that becomes too large because of wear can be counteracted. To this end, the determination of the minimum distance $s_M$ between the base plates 7, 8 should be carried out at specific time intervals, preferably periodically, wherein it is necessary to take account of the fact that the average wear can quite possibly amount to 0.1 mm per day.

Since this process is carried out during the rotation, the stoppage times of the treatment device are minimized.

In order to prevent excessive wear of the treatment tools 3, 4, it may be advantageous to adjust the distance s between the base plates 7, 8 during operation by a predefined value above the minimum distance $s_M$ as a safety margin.

In the two exemplary embodiments, in order to determine the minimum distance $s_M$ between the base plates 7, 8, the oscillations are detected via one or more sensors arranged on the housing 2.

At the same time, the distance s between the base plates 7, 8 rotating relative to each other can be reduced continuously, beginning with a relatively large distance, until the change in the frequency $\Delta f$ exceeds a limiting value.

The distance s at which this limiting value is exceeded is then defined as the minimum distance $s_M$.

Figure 3:
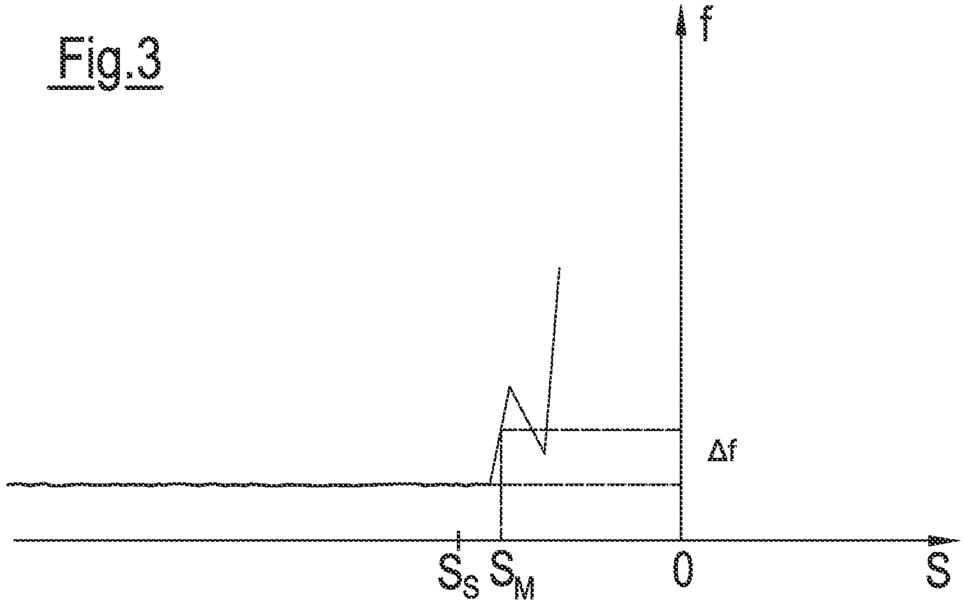
FIG. 3 shows the change in the distances s of the base plates of the treatment tools over the oscillation frequency f.

For both specific applications, FIG. 3 illustrates the course of the frequency of oscillation f as the distance s between the base plates 7, 8 is reduced.

Advantageously, the measurement is carried out in the absence of fibrous material 1.

The invention claimed is:

1. A method for controlling a device for treating fibrous material, the method comprising:

providing the device with a housing, a first treatment tool and a second treatment tool arranged in the housing and each affixed to a base plate, the first and second treatment tools having a rotationally symmetrical form, being arranged coaxially with respect to each other, being rotatable relative to one another about a common axis, and delimiting a treatment gap through which the fibrous material flows radially, and the treatment gap having a variable gap width to be varied by an axial displacement of at least one of the base plates of the treatment tools;

determining a minimum distance between the base plates by detecting oscillations on the device and decreasing a distance between the base plates that rotate relative to one another until a frequency of the oscillations or an amplitude of the oscillations exceeds a limiting value;

setting a rotational speed during the step of determining the minimum distance between the base plates to below an operating rotational speed; and defining the distance between the base plates when the limiting value is exceeded as the minimum distance.

2. The method according to claim 1, which comprises adjusting the distance between the base plates during operation to a predefined value above the minimum distance as a safety margin.

3. The method according to claim 1, wherein the decreasing of the distance occurs in steps.

4. The method according to claim 1, wherein the decreasing of the distance occurs continuously.

5. The method according to claim 1, which comprises carrying out the step of determining the minimum distance between the base plates during a start-up of the device and/or following a change of one of the treatment tools.

6. The method according to claim 1, which comprises carrying out the step of determining the minimum distance between the base plates during an operation of the device.

7. The method according to claim 6, which comprises carrying out the step of determining the minimum distance between the base plates at specific time intervals.

8. The method according to claim 1, which comprises setting a rotational speed during the step of determining the minimum distance between the base plates in a range of the operating rotational speed.

9. The method according to claim 1, which comprises causing the fibrous material to flow through the treatment gap during the step of determining the minimum distance.

10. The method according to claim 9, wherein during the step of determining the minimum distance between the base plates, at least a quantity of the fibrous material flowing through the treatment gap or a temperature of the fibrous material or a consistency of the fibrous material or an electrical power consumption of the device lie in a predefined operating range.

11. The method according to claim 1, wherein the fibrous material does not flow through the treatment gap during the step of determining the minimum distance.

12. The method according to claim 1, which comprises rotating one of the treatment tools while the other of the treatment tools does not rotate.

13. The method according to claim 1, which comprises axially displacing only one of the treatment tools.

14. The method according to claim 1, wherein the device is selected from the group consisting of a disperger, a refiner, and a deflaker and the method comprises carrying out the step of determining the minimum distance in the disperger, the refiner, or the deflaker.

15. A method for controlling a device for treating fibrous material, the method comprising:

providing the device with a housing, a first treatment tool and a second treatment tool arranged in the housing and each affixed to a base plate, the first and second treatment tools having a rotationally symmetrical form, being arranged coaxially with respect to each other, being rotatable relative to one another about a common axis, and delimiting a treatment gap through which the fibrous material flows radially, and the treatment gap having a variable gap width to be varied by an axial displacement of at least one of the base plates of the treatment tools;

determining a minimum distance between the base plates by detecting oscillations on the device and decreasing a distance between the base plates that rotate relative to one another until a frequency of the oscillations or an amplitude of the oscillations exceeds a limiting value;

defining the distance between the base plates when the limiting value is exceeded as the minimum distance; and detecting the width of the treatment gap width during an operation of the device for treating the fibrous material and, following the step of determining the minimum distance, measuring a change in an axial distance between the base plates and using the measurement as a reference base for the width of the treatment gap.

16. A method for controlling a device for treating fibrous material, the method comprising:

providing the device with a housing, a first treatment tool and a second treatment tool arranged in the housing and each affixed to a base plate, the first and second treatment tools having a rotationally symmetrical form, being arranged coaxially with respect to each other, being rotatable relative to one another about a common axis, and delimiting a treatment gap through which the fibrous material flows radially, and the treatment gap having a variable gap width to be varied by an axial displacement of at least one of the base plates of the treatment tools;

determining a minimum distance between the base plates by detecting oscillations on the device and decreasing a distance between the base plates rotating relative to one another until a change in a frequency (Δf) of the oscillations or a change in an amplitude of the oscillations exceeds a limiting value; and setting a rotational speed during the step of determining the minimum distance between the base plates to below an operating rotational speed; and defining the distance when the limiting value is exceeded as the minimum distance.

17. The method according to claim 16, which comprises adjusting the distance between the base plates during operation to a predefined value above the minimum distance as a safety margin.

18. The method according to claim 16, wherein the decreasing of the distance occurs in steps.

19. The method according to claim 16, wherein the decreasing of the distance occurs continuously.

20. The method according to claim 16, carrying out the step of determining the minimum distance between the base plates during a start-up of the device and/or following a change of one of the treatment tools.

21. The method according to claim 16, which comprises carrying out the step of determining the minimum distance between the base plates during an operation of the device.

22. The method according to claim 21, which comprises carrying out the step of determining the minimum distance between the base plates at specific time intervals.

23. The method according to claim 16, which comprises setting a rotational speed during the step of determining the minimum distance between the base plates in a range of the operating rotational speed.

24. The method according to claim 16, which comprises causing the fibrous material to flow through the treatment gap during the step of determining the minimum distance.

25. The method according to claim 24, wherein during the step of determining the minimum distance between the base plates, at least a quantity of the fibrous material flowing through the treatment gap or a temperature of the fibrous material or a consistency of the fibrous material or an electrical power consumption of the device lie in a predefined operating range.

26. The method according to claim 16, wherein the fibrous material does not flow through the treatment gap during the step of determining the minimum distance.

27. The method according to claim 16, which comprises rotating one of the treatment tools while the other of the treatment tools does not rotate.

28. The method according to claim 16, which comprises axially displacing only one of the treatment tools.

29. The method according to claim 16, wherein the device is selected from the group consisting of a disperger, a refiner, and a deflaker and the method comprises carrying out the step of determining the minimum distance in the disperger, the refiner, or the deflaker.

30. A method for controlling a device for treating fibrous material, the method comprising:

providing the device with a housing, a first treatment tool and a second treatment tool arranged in the housing and each affixed to a base plate, the first and second treatment tools having a rotationally symmetrical form, being arranged coaxially with respect to each other, being rotatable relative to one another about a common axis, and delimiting a treatment gap through which the fibrous material flows radially, and the treatment gap having a variable gap width to be varied by an axial displacement of at least one of the base plates of the treatment tools;

determining a minimum distance between the base plates by detecting oscillations on the device and decreasing a distance between the base plates rotating relative to one another until a change in a frequency (Δf) of the oscillations or a change in an amplitude of the oscillations exceeds a limiting value;

defining the distance when the limiting value is exceeded as the minimum distance; and detecting the width of the treatment gap during an operation of the device for treating the fibrous material and, following the step of determining the minimum distance, measuring a change in an axial distance between the base plates and using the measurement as a reference base for the width of the treatment gap.

* * * * *